United States Patent [19]
Yatsuka et al.

[11] Patent Number: 4,942,219
[45] Date of Patent: Jul. 17, 1990

[54] VISCOELASTIC RESIN FOR VIBRATION DAMPING MATERIAL AND COMPOSITION CONTAINING THE SAME

[75] Inventors: Takeshi Yatsuka; Seiji Yamazoe; Hiroshi Hirakouchi; Yutaka Mizumura, all of Osaka; Hiroshi Endo; Nobuo Kadowaki, both of Sagamihara, all of Japan

[73] Assignees: Toyo Boseki Kabushiki Kaisha, Osaka; Nippon Steel Corporation, Tokyo, both of Japan

[21] Appl. No.: 260,303

[22] Filed: Oct. 20, 1988

[30] Foreign Application Priority Data

Oct. 20, 1987 [JP] Japan ................................ 62-264819

[51] Int. Cl.$^5$ .............................................. C08G 63/02
[52] U.S. Cl. .................................... 528/272; 528/288; 528/296; 528/297; 528/299; 528/302; 528/308; 528/308.7; 428/245; 428/246; 428/256; 428/458; 428/924; 525/438; 525/440; 525/454; 252/62
[58] Field of Search ............... 528/272, 288, 296, 297, 528/299, 302, 308, 308.7; 428/245, 246, 256, 458, 924; 525/438, 440, 454; 252/62

[56] References Cited

U.S. PATENT DOCUMENTS

| | | | |
|---|---|---|---|
| 4,584,353 | 4/1986 | Kobayashi et al. | 525/438 |
| 4,623,586 | 11/1986 | Umeya et al. | 428/324 |
| 4,740,427 | 4/1988 | Ochiumi et al. | 428/463 |
| 4,766,028 | 8/1988 | Rich | 428/253 |

FOREIGN PATENT DOCUMENTS

| | | |
|---|---|---|
| 0070118 | 1/1983 | European Pat. Off. . |
| 39-12451 | 7/1964 | Japan . |
| 50-143880 | 11/1975 | Japan . |
| 51-91981 | 8/1976 | Japan . |
| 51-93770 | 8/1976 | Japan . |
| 52-26554 | 7/1977 | Japan . |
| 55-27975 | 7/1980 | Japan . |
| 56-159160 | 12/1981 | Japan . |
| 57-34949 | 2/1982 | Japan . |
| 62-74645 | 4/1987 | Japan . |

Primary Examiner—John Kight, III
Assistant Examiner—S. A. Acquah
Attorney, Agent, or Firm—Wegner & Bretschneider

[57] ABSTRACT

The use of an amorphous block copolyester resin as a viscoelastic resin for a composite vibration damping material, and a viscoelastic resin composition for a composite vibration damping material which comprises the amorphous block copolyester resin and at least one compound selected from the group consisting of polyepoxy compounds, polyisocyanate compounds and acid anhydrides.

15 Claims, No Drawings

VISCOELASTIC RESIN FOR VIBRATION DAMPING MATERIAL AND COMPOSITION CONTAINING THE SAME

FIELD OF THE INVENTION

The present invention relates to a viscoelastic resin for a vibration damping material and a composition containing the same. More particularly, the viscoelastic resin and the composition containing it of the present invention are useful for a middle layer of a vibration damping material having a composite laminate structure which is used as a structural component of various structures such as machines, buildings, vehicles and the like, or a part thereof.

BACKGROUND OF THE INVENTION

Recently, noises and vibration problems have become an object of public concern as an environmental pollution with development of means of transportation and increase in residential areas which are located near factories and the like. Further, in a workshop, there is a tendency to limit noises and vibration to improve working atmosphere. To cope with these tendencies, it is requested to impart vibration damping property to a metallic material which is a source of noises and vibration, that is, to impart a function to a noise generating member itself so that the member can absorb its own vibrational energy and convert it into heat energy to attenuate frequency of vibration or vibrational amplitude, thereby noise is decreased. Further, it is requested to improve such a function.

Based on these requests, as one of vibration damping materials having desired property, there has been proposed a vibration damping material having a composite laminate structure wherein a middle layer having viscoelasticity is sandwiched by metal layers. This type of a composite vibration damping material has been studied and employed as oil pans of automobiles, engine covers, chutes of hoppers, stopper of conveying apparatus, domestic electric equipments, vibration reducing members of other metal processing machines, structural members of precision machines in which prevention of vibration is desirable and the like.

In general, the vibration damping property of such a composite vibration damping material depends upon the property of a viscoelasticity layer which constitutes the middle layer thereof. When the vibration damping property is expressed as a loss factor (which is a measure of conversion of an external vibrational energy into a heat energy by internal friction, and is corresponding to a value relating to mechanical hysteresis loss due to vibration), the property shows a peak at a certain temperature. It has been known that it is most effective to use a vibration damping material at about this temperature showing the peak property.

Hitherto, as a viscoelastic composition which constitutes the middle layer of such a composite vibration damping material, there have been known a simple polyester (Japanese Patent Kokai No. 50-143880) or a polyester to which a plasticizer is added (Japanese Patent Kokai No. 51-93770); a simple polyurethane foam (Japanese Patent Kokai No. 51-91981); a simple polyamide (Japanese Patent Kokai No. 56-159160); a simple ethylene-polyvinyl acetate copolymer (Japanese Patent Kokai No. 57-34949); a composition of a polyvinyl butyral or a polyvinyl butyral and a polyvinyl acetate to which a plasticizer and a tackifier are added (Japanese Patent Kokoku No. 55-27975); a copolymer of a isocyanate prepolymer and a vinyl monomer (Japanese Patent Kokoku No. 52-26554); copolymers disclosed in Japanese Patent Kokoku Nos. 39-12451 and 45-34703(see counterpart U.S. Pat. No. 3,640,833), and Japanese Patent Kokai No. 62-74645; and the like.

Although, first of all, it is required that a composite vibration damping material should have a high value of the above loss factor as well as a high adhesive strength between a viscoelastic middle layer and a metal layer, the composite vibration damping material made of the above known viscoelastic composition has problems in any of these properties and is unsatisfactory. Particularly, in order to impart high vibration damping properties at about room temperature, it is necessary to set a glass transition temperature of a viscoelastic composition at below room temperature. However, when a glass transition temperature of a conventional resin is lowered, adhesion strength is also remarkably lowered. Therefore, it can not be used in a field requiring high adhesion.

Further, in a conventional vibration damping material, a temperature range in which vibration damping property is shown is very narrow and it is a problem in practice. For example, with the polyester or the mixture of the polyester and the plasticizer disclosed in the above Japanese Patent Kokai Nos. 50-143880 and 51-93770, its temperature range in which vibration damping property is shown is very narrow and, when it shows high vibration damping property at about room temperature, its adhesion strength is low. Both vibration damping property and adhesion strength of the polyester elastomer disclosed in the above Japanese Patent Kokai No. 62-74645 are insufficient. Particularly, when the polymer contains poly(alkylene oxide)glycol, heat resistance is also deteriorated, which results in limitation to usage. Further, by heating at baking finish, sometimes, adhesive power of a middle layer is lowered due to heat deterioration and peeling is caused.

Furthermore, in a conventional composite vibration damping material using a steel plate, durability is also insufficient. For example, a surface of the steel plate faced to the middle layer is rusted and adhesive force is lowered with time under various environmental conditions. Although it is effective to cure a middle layer to improve durability, vibration damping property is deteriorated by cure according to a conventional manner.

Thus, there has not been obtained a vibration damping material having both satisfactory vibration damping property and adhesion as well as good durability.

In the present assignees' U.S. Patent Application Ser. No. 085,718, there is disclosed a viscoelastic resin useful for a vibration damping material comprising a specific polyester diol, an aliphatic polyester diol, a diisocyante compound and a chain extender. This viscoelastic resin shows improved vibration damping property as well as improved adhesion when it is sandwiched between steel plates and improved press moldability when it is used as a middle layer of a composite vibration damping steel plate.

The present invention provides a viscoelastic resin useful for a middle layer of a composite vibration damping material having a wide effective temperature range of vibration damping property, particularly, having high vibration damping property even at about room temperature, and having good durability as well as maintaining high adhesive power even after baking finish.

This object as well as other objects and advantages of the present invention will become apparent to those skilled in the art from the following description.

SUMMARY OF THE INVENTION

The present inventors have found that an amorphous block copolyester resin is suitable for a viscoelastic resin for a vibration damping material which has a wide effective temperature range of vibration damping property, good durability and high adhesive power.

Thus, according to the present invention, there is provided the use of an amorphous block copolyester resin as a viscoelastic resin for a composite vibration damping material.

The present invention also provides a viscoelastic resin composition for a composite vibration damping material which comprises an amorphous block copolyester resin and at least one compound selected from the group consisting of polyepoxy compounds, polyisocyanate compounds and acid anhydrides.

DETAILED DESCRIPTION OF THE INVENTION

In view of extension of an effective temperature range of vibration damping property, improvement of adhesive power and the like, it is desired that the amorphous block copolyester resin of the present invention comprises a block segment having a higher glass transition temperature and a block segment having a lower glass transition temperature. The glass transition temperature of the higher glass transition temperature block segment is not lower than 40° C. and the difference between the glass transition temperature of the higher glass transition temperature segment and that of the lower glass transition temperature segment is not less than 50° C., when the glass transition temperature is measured with respect to each segment in the form that having a molecular weight of not lower than 10,000 alone.

The amorphous block copolyester used in the present invention can be produced according to a conventional method. For example, the following methods can be employed.

(1) A method wherein different kinds of polyesters are reacted in a molten or solution state by utilizing a reaction between the terminal groups thereof.

(2) A method wherein a lactone such as δ-valerolactone, ε-caprolactone, β-propiolactone, β-2,2dimethylpropiolactone or the like is polymerized by ring opening addition at the terminal groups of polyesters.

The latter ring opening addition polymerization of a lactone is preferred from the viewpoint of properties of the resulting composite vibration damping material, economy of the production of the block copolyester resin and the like.

The block copolyester used in the present invention is amorphous. The term "amorphous" used herein means that no clear melting peak appeared in a measurement by a differential scanning calorimeter at a temperature rising rate of 10° C./min. in a nirrogen atmosphere. Because the block copolyester of the present invention is amorphous, the vibration damping property is improved and further a phenomenon such as lowering of adhesive power with time due to progress of crystallization, which is observed in a crystalline polyester, is not observed.

Although the block copolyester used in the present invention is amorphous, all polyesters which constitute the blocks are not necessarily required to be amorphous.

In the present invention, the amorphous block copolyester is that having a reduced viscosity of not less than 0.4 dl/g, preferably not less than 0.5 dl/g. The reduced viscosity used herein is that measured in a mixture of phenol/tetrachloroethane (6/4, w/w) at 30° C. in a concentration of 0.4 g/100 cc. When the reduced viscosity is less than 0.4 dl/g, the molecular weight becomes too low, which results in deterioration of both adhesion and vibration damping property. The upper limit of the reduced viscosity is defined by workability and, preferably, it is not more than 1.8 dl/g. In view of adhesion and vibration damping property, a higher reduced viscosity is more preferred.

From the viewpoint of extension of an effective temperature range of vibration damping, improvement of adhesion, particularly maintenance of adhesion after baking finish, less change of adhesion with time under various environments and the like, it is desired that the amorphous block copolyester used in the present invention preferably contains a tri- or higher poly-functional ester-forming component such as trimellitic acid anhydride, trimethylolpropane, pentaerythritol, dipentaerythritol or the like in an amount of 10 to 200 equivalent, preferably 30 to 150 equivalent per $10^6$ g of resin.

Examples of the dibasic acid component of the amorphous block copolyester used in the present invention include aliphatic dicarboxylic acids such as succinic acid, adipic acid, azelaic acid, sebacic acid, decamethylene dicarboxylic acid, dodecane dicarboxylic acid, tetradecane dicarboxylic acid, dimer acid and the like; alicyclic dicarboxylic acids such as 1,4-cyclohexane dicarboxylic acid, 1,3-cyclohexane dicarboxylic acid and the like; and aromatic carboxylic acids such as terephthalic acid, isophthalic acid, orthophthalic acid, 1,5-naphthalene dicarboxylic acid, 2,6-naphthalene dicarboxylic acid and the like.

Further, there can be used hydroxyl carboxylic acids such as p-hydroxybenzoic acid, p-(2-hydroxyethoxy)-benzoic acid and the like; metal sulfonate containing dibasic acids such as 5-sodium sulfoisophthalate, 5-potassium sulfoisophthalate and the like; and further tri- or higher poly-functional acid amhydrides such as trimellitic acid anhydride and pyromellitic acid anhydride.

Among these acid components, terephthalic acid, isophthalic acid, adipic acid, azelaic acid, sebacic acid, 5-sodium sulfoisophthalate, 5-potassium sulfoisophthalic acid and trimellitic acid anhydride are preferred. Particularly, 5-sodium sulfophthalic acid and 5-potassium sulfoisophthalic acid are effective for enhancing toughness of the block copolyester resin due to intermolecular ionic interaction, which results in improvement of adhesive power.

Examples of the glycol component of the block copolyester used in the present invention include ethylene glycol, 1,2-propanediol, 1,3-propanediol, 1,4-butanediol, 1,5-pentanediol, 1,6-hexanediol, 1,9-nonanediol, 3-methylpentanediol, neopentyl glycol, 2-ethyl-2-methyl-1,3-propanediol, 2-butyl-2-ethyl-1,3-propanediol, neopentyl glycol hydroxypivalate, 1,4-cyclohexane dimethanol, ethylene oxide adduct of bisphenol A, propylene oxide adduct of bisphenol A, ethylene oxide adduct of hydroquinone, propylene oxide adduct of hydroquinone and the like. Further, there can be used tri- or higher polyfunctional compounds such as glycerin, trimethylolpropane, pentaerythritol, dimethylol propionic acid and the like. Among them, ethylene glycol, neopentyl glycol, neopentyl glycol hydroxypivalate, ethylene oxide adduct of bisphenol A and cyclohexane dimethanol are preferred.

As the lactones to be used for ring open addition polymerization at the terminals of the polyesters, there can be used $\beta$-propiolactone, $\beta$-2,2-dimethylporpiolactone, $\delta$-valerolactone, $\delta$-3-methylvalerolactone, $\epsilon$-caprolactone and the like.

In the case that a glass transition temperature of the polyester before ring open addition polymerization is not lower than 40° C., $\epsilon$-caprolactone and $\delta$-valerolactone are preferred. When it is not higher than room temperature, $\beta$-propiolactone having a substituent is preferred.

The amorphous block copolyester of the present invention can be used alone to obtain a vibration damping material having excellent vibration damping property and adhesion as well as a wide effective temperature range of vibration damping property. However, if necessary, it can be used together with one or more other resins such as polyurethane resins, epoxy resins, petroleum resins, acrylic copolymers and the like. The ratio of the polyester resin and the other resin is not limited to a specific range and can be determined by a person skilled in the art from a particular use of the resulting vibration damping material.

Further, if necessary, it can be used together with one or more compounds selected from the group consisting of polyepoxy compounds, polyisocyanates and acid anhydrides which are reactive with the polyester resin.

By incorporation with such compounds which are reactive with the polyester resin, the middle layer of a resulting vibration damping material has improved resistance to hydrolysis and adhesion to an interface of a metal plate, which results in further improvement of durability of the vibration damping material. And, by formation of a crosslinked structure in the middle layer, its heat deterioration, peeling and the like at heating during baking finish can be prevented.

Examples of the polyepoxy compounds include those containing two or more glycidyl groups in a molecule such as epi-bis type epoxy resins, alicyclic epoxy resins, glycidyl ester resins, glycidyl amine resins, glycidyl ether resins, novolak type epoxy resins and the like. Examples of the polyisocyanate compounds include bi- or higher polyfunctional aliphatic, alicyclic and aromatic polyisocyanate compounds. In view of volatility, adhesion and durability, tri- or higher polyfunctional compounds are preferred. Examples of the acid anhydrides include aliphatic acid anhydrides, alicyclic acid anhydrides, aromatic acid anhydrides and the like which contain at least one acid anhydride group, preferably two or more acid anhydride groups in a molecule. Particularly, it is preferred to use a polyisocyanate compound, a combination of a polyisocyanate compound and a polyepoxy resin, a combination of a polyepoxy resin and an acid anhydride and a combination of a polyisocyanate compound, a polyepoxy resin and an acid anhydride are preferred.

The ratio of the polyester resin and the compounds having reactivity with it is not limited to a specific range but, usually, it is at most about 60 parts by weight, preferably 2 to 50 parts by weight as the total weight of the compounds per 100 parts by weight of the polyester resin.

There can be further added one or more additives, for example, various fibers such as glass fibers, polyester fibers, carbon fibers and the like and various particles such as calcium carbonate particles, magnesium carbonate particles and the like to reinforce the resin; various metal powders such as stainless powder, aluminum powder and the like, metal fibers, and conductive particles such as carbon black, graphite and the like to impart spot welding property; various coupling agents to improve adhesion between inorganic components and the resin; various leveling agents to improve coating properties; antioxidants such as phenolic antioxidants, hindered amine antioxidants and the like to improve heat resistance; and the like.

The composition of the present invention can be prepared by a standard manner, for example, admixing, dispersing and/or dissolving desired components in a conventional solvent.

The amorphous block copolyester resin or a composition containing the resin can be used for producing a composite vibration damping material wherein a middle layer of the resin or its composition is sandwiched between metal plates. The metal plate to be used is not specifically limited and it may be a steel plate, aluminum plate, copper plate, a brass plates or the like. The metal plate may be the same or different from each other and the vibration damping material can contain three or more metal plates.

The composite vibration damping material can be produced according to a known method, for example, by using previously molded film of the amorphous block copolyester resin or its composition, or by directly melt-extruding the resin or its composition on a surface of a metal plate to adhere it to the metal plate with heating. Further, the middle layer can be formed by coating a solution of the amorphous block copolyester resin in a conventional solvent or a liquid composition of the resin on a metal plate, drying the plate and adhering the resin or the composition to the plate with heating.

According to the present invention, by using the amorphous block copolyester resin, extension of an effective temperature range of vibration property, improvement of adhesive power can be achieved because of the difference between the glass transition temperature of the higher glass transition temperature segment and that of a lower glass transition temperature segment. Further, the vibration damping property is improved due to the amorphous property of the resin. Particularly, this tendency becomes more significant when the amorphous block copolyester resin is highly branched and has a higher molecular weight.

In the case of the amorphous block copolyester resin obtained by ring open addition polymerization of $\epsilon$-caprolactone, $\delta$-valerolactone or the like, it has high reactivity with a polyisocyanate compound, a polyepoxy resin and an acid anhydride and therefore, when one or more of these latter compounds are incorporated with the resin, adhesion, resistance to hydrolysis, heat resistance can be improved. As the result, durability of a resulting composite vibration damping material is improved.

The following Preparations and Examples further illustrate the present invention in detail but are not to be construed to limit the scope thereof. In the Preparations and Examples, all "parts" are by weight unless otherwise stated.

PREPARATIONS 1 to 10

Synthesis of amorphous block copolyester

Dimethyl terephthalate (238 parts), dimethyl isophthalate (238 parts), trimellitic acid anhydride (9.6 parts), ethylene glycol (186 parts), neopentyl glycol (208 parts) and tetrabutyl titanate (0.17 part) were placed in a reactor equipped with a thermometer, a stirrer and a reflux condenser. Ester interchange reaction was carried out at 180 to 230° C. for 8 hours and then the pressure of the reaction system was reduced to 5 mmHg over 30 minutes. During this time, the temperature rose to 250° C. Then, polycondensation reaction was carried out under the pressure of 0.3 mmHg at 250° C. for 30 minutes. The polyester thus obtained had the reduced viscosity of 0.61 dl/g. Then, nitrogen gas was introduced into this reaction system and $\epsilon$-caprolactone (399 parts) was placed in the reactor. After the reaction system was thoroughly mixed, the system was heated at 220° C. for 2 hours to obtain a copolyester. According to the analysis by NMR, differential scanning calorimeter and the like, the resulting polyester was an amorphous block copolyester having the reduced viscosity of 0.88 dl/g.

According to the same manner, the block copolyesters as shown in Table 1 hereinafter were obtained. In Preparations 4 to 6 and 8 in Table 1, depolymerization with trimethylolpropane, pentaerythritol and dipentaerythritol were effected before addition polymerization with the lactone as in Preparation 1.

REFERENCE PREPARATIONS 1 and 2

According to the same manner as described in Preparation 1, dimethyl phthalate (194 parts), 1,4-butanediol (180 parts) and tetrabutyl titanate (0.07 part) were placed in the same reactor as that of Preparation 1 to obtain polybutylene terephthalate having the reduced viscosity of 0.78 dl/g. Further, according to the same manner as in Preparation 1, after introduction of nitrogen gas into the reaction system, $\epsilon$-caprolactone (114 parts) was placed in the reactor and reacted at 220° C. for 2 hours to obtain the copolyester. The resulting copolyester was the crystalline block copolymer having the reduced viscosity of 1.03 dl/g and the melting point of 198° C.

The Reference Preparation 2 is a crystalline block copolyester having the composition as shown in Table 2 hereinafter and obtained according to the same manner as described in Reference Preparation 1.

REFERENCE PREPARATIONS 3 to 5

According to the same manner as described in Preparations 1, 2 and 5, polycondensation reaction was carried out except that $\epsilon$-caprolactone was added after ester interchange reaction to obtain the polyester resin. The resulting polyester resin was amorphous but a random polymer. In Reference Preparation 5, pentaerythritol was firstly added. The composition and other analytical data are shown in Table 2 hereinafter.

PREPARATION 11

An aliphatic polyester having acid chloride groups at the terminals was prepared by heating neopentyl glycol (104 parts) and adipylchloride (188 parts) in o-dichlorobenzene (200 parts) at 80° C. for 5 hours with introducing nitrogen gas. o-Dichlorobenzene and unreactive adipylchloride were removed by distillation under reduced pressure. The resulting polyester had the reduced viscosity of 0.35 dl/g and the terminal groups thereof were acid chloride groups. No hydroxyl group and carboxyl group were detected by IR spectrophotometer.

To this viscous aliphatic polyester (200 parts) was added a solution of the polyester obtained before addition of $\epsilon$-caprolactone in Preparation 2 (300 parts) in methyl ethyl ketone (300 parts) and the mixture was reacted at 70° C. for 4 hours with introducing nitrogen gas. The solution (2000 parts) was poured into water to aggregate the polyester resin. The product was dried at 50 to 60° C. under vacuum to 20 hours. The resulting polyester was an amorphous block copolyester resin having the reduced viscosity of 0.81 dl/g and the composition (molar ratio of each component) of the resin was terephthalic acid/isophthalic acid/adipic acid//ethylene glycol/neopentyl glycol of 30/30/40//30/70 (molar ratio).

REFERENCE PREPARATION 6

According to the same manner as described in Reference Preparation 3, ester interchange reaction was carried out by using dimethyl terephthalate (58 parts), dimethyl isophthalate (58 parts), ethylene glycol (50 parts), neopentyl glycol (125 parts) and tetrabutyl titanate (0.07 part). Then, adipic acid (58 parts) was added and esterification followed by polycondensation were carried out to obtain a random copolyester resin. The composition of the resin was terephthalic acid/isophthalic acid/adipic acid//ethylene glycol/neopentyl glycol of 30/30/40//30/70 (molar ratio) and the reduced viscosity thereof was 1.10 dl/g.

PREPARATION 12

According to the same manner as described in Preparation 1, $\epsilon$-caprolactone was ring open addition polymerized to terephthalic acid/isophthalic acid/trimellitic acid,/3-methylpentanediol/neopentyl hydroxy pivalate and then trimellitic acid anhydride was added under a nitrogen atmosphere. The reaction mixture was stirred at 220° C. for 30 minutes. The composition and properties of the resulting block copolyester having carboxy terminal groups are shown in Table 1.

REFERENCE PREPARATION 7

According to the same manner as described in Reference Preparation 3, a random copolyester was prepared except for use of the same raw materials as those of Preparation 12. Then, the product was converted into that having carboxyl terminal groups. The composition and properties of the resulting polyester are shown in Table 2.

TABLE 1

| | Composition of resin (molar ratio) | | | | | | | | | | | |
|---|---|---|---|---|---|---|---|---|---|---|---|---|
| | Preparation No. | | | | | | | | | | | |
| | 1 | 2 | 3 | 4 | 5 | 6 | 7 | 8 | 9 | 10 | 11 | 12 |
| Acid component | | | | | | | | | | | | |
| Terephthalic acid | 49 | 50 | 48 | — | — | — | 48 | 49 | 49 | — | 30 | 50 |

TABLE 1-continued

| | Composition of resin (molar ratio) Preparation No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Isophthalic acid | 49 | 50 | 48 | 80 | 80 | 80 | 48 | 49 | 49 | — | 30 | 48.5 |
| Orthophthalic acid | — | — | — | 20 | 20 | 20 | — | — | — | — | — | — |
| Adipic acid | — | — | — | — | — | — | — | — | — | 50 | 40 | — |
| Azelaic acid | — | — | — | — | — | — | — | — | — | 50 | — | — |
| Trimellitic acid anhydride | 2 | — | — | — | — | — | 4 | 2 | 2 | — | — | 3* |
| 5-Sodium sulfo-isophthalic acid | — | — | 4 | — | — | — | — | — | — | — | — | — |

Note
*1.5 was added initially and then 1.5 was added later.

| Glycol component | | | | | | | | | | | | |
|---|---|---|---|---|---|---|---|---|---|---|---|---|
| Ethylene glycol | 55 | 55 | — | 20 | 20 | 20 | — | 30 | 70 | — | 30 | — |
| Neopentyl glycol | 45 | 45 | 50 | 80 | 80 | 80 | — | — | — | 100 | 70 | — |
| 3-Methylpentanediol | — | — | 50 | — | — | — | 20 | — | — | — | — | 25 |
| 1,4-Butanediol | — | — | — | — | — | — | — | 70 | — | — | — | — |
| Ethylene oxide adduct of bisphenol A (MW 340) | — | — | — | — | — | — | 80 | — | — | — | — | — |
| Cyclohexane-dimethanol | — | — | — | — | — | — | — | — | 30 | — | — | — |
| Neopentyl glycol hydroxy pivalate | — | — | — | — | — | — | — | — | — | — | — | 75 |
| Depolymerization component | | | | | | | | | | | | |
| Trimethylolpropane | — | — | — | 4 | — | — | — | — | — | — | — | — |
| Pentaerythritol | — | — | — | — | 2 | — | — | — | — | 2 | — | — |
| Dipentaerythritol | — | — | — | — | — | 0.5 | — | — | — | — | — | — |
| Reduced viscosity before addition of lactone (dl/g) | 0.61 | 0.55 | 0.51 | 0.54 | 0.42 | 0.37 | 0.68 | 0.65 | 0.64 | 0.49 | — | 0.93 |
| Lactone component | | | | | | | | | | | | |
| $\epsilon$-Caprolactone | 140 | 60 | 120 | 150 | 160 | 180 | — | — | — | — | — | 80 |
| $\delta$-3-Methyl-valerolactone | — | — | — | — | — | — | 220 | 160 | 160 | — | — | — |
| $\beta$-2,2-dimethyl-propiolactone | — | — | — | — | — | — | — | — | — | 180 | — | — |
| Properties of resin | | | | | | | | | | | | |
| Reduced viscosity (dl/g) | 0.88 | 0.78 | 0.76 | 0.89 | 1.12 | 1.22 | 1.23 | 1.03 | 0.98 | 1.02 | 0.81 | 0.85 |
| Acid value (equiv./$10^6$ g) | 12 | 18 | 22 | 8 | 13 | 15 | 17 | 18 | 18 | 24 | 26 | 180 |
| Crystallizability* | A | A | A | A | A | A | A | A | A | A | A | A |
| Regularity** | B | B | B | B | B | B | B | B | B | B | B | B |

Note
*A: amorphous
**B: block

TABLE 2

| | Composition (molar ratio) and properties Reference Preparation No. | | | | | | |
|---|---|---|---|---|---|---|---|
| | 1 | 2 | 3 | 4 | 5 | 6 | 7 |
| Acid component | | | | | | | |
| Terephthalic acid | 100 | 100 | 49 | 50 | — | 30 | 50 |
| Isophthalic acid | — | — | 49 | 40 | 80 | 30 | 48.5 |
| Orthophthalic acid | — | — | — | — | 20 | — | — |
| Adipic acid | — | — | — | — | — | 40 | — |
| Trimellitic acid anhydride | — | — | 2 | — | — | — | 3* |
| Alcohol component | | | | | | | |
| Ethylene glycol | — | — | 55 | 55 | 20 | 30 | — |
| Neopentyl glycol | — | — | 45 | 45 | 80 | 70 | — |
| 1,4-Butanediol | 100 | 100 | — | — | — | — | — |
| Pentaerythritol | — | — | — | — | 2 | — | — |
| 3-Methylpentanediol | — | — | — | — | — | — | 25 |
| Neopentyl hydroxy pivalate | — | — | — | — | — | — | 75 |
| Reduced viscosity before addition of lactone (dl/g) | 0.78 | 0.83 | — | — | — | — | — |

Note
*1.5 was added initially and then 1.5 was added later.

| Lactone component | | | | | | | |
|---|---|---|---|---|---|---|---|
| $\epsilon$-Caprolactone | 100 | 180 | 155 | 115 | 175 | — | 85 |
| Properties of resin | | | | | | | |
| Reduced viscosity (dl/g) | 1.03 | 1.28 | 0.92 | 0.70 | 0.38 | 1.10 | 0.88 |
| Acid value (equiv./$10^6$ g) | 18 | 19 | 12 | 10 | 12 | 26 | 190 |

TABLE 2-continued

| Composition (molar ratio) and properties | | | | | | | |
|---|---|---|---|---|---|---|---|
| | Reference Preparation No. | | | | | | |
| | 1 | 2 | 3 | 4 | 5 | 6 | 7 |
| Crystallizability* | C (mp: 198° C.) | C (mp: 175° C.) | A | A | A | A | A |
| Regularity** | B | B | R | R | R | R | R |

Note
*C: crystalline A: amorphous
**B: block R: random

EXAMPLE 1

To a solution of the polyester obtained in Preparation 1 in cyclohexane/toluene (1/1, v/v) (solids content of 30 %) was added a polyisocyanate compound (Coronate L manufactured by Nippon Polyurethane Company, Japan) in an amount of 10 %. This solution was coated on each surface of two phosphoric acid treated steel plates each having 0.8 mm in thickness so that the coating thickness after drying with hot air at 200° C. for 2 minutes became 25 μm. Then, the coated surfaces were laid on each other and press-bonded at 190° C. for 2 minutes under pressure of 5 kg/cm².

The laminate thus obtained was evaluated according to the following manner.

(1) Adhesion

Shear adhesive power of a sample (25 mm × 10 mm) of the laminate was measured at an elongation rate of 50 mm/min. and at a temperature of 20° C. The measurement was carried out both before and after heat treatment with the sample at 200° C. for 30 minutes. This heat treatment was effected by imaging baking finish.

(2) Vibration damping property

The damping factor (η) of a sample (30 mm × 300 mm) of the composite steel plate sample with vibration of 500 Hz at a different temperature was measured according to mechanical impedance method. A sample having a larger η shows more superior vibration damping property.

The results are shown in Table 3 hereinafter.

EXAMPLES 2 to 11 AND REFERENCE EXAMPLES 1 to 4

According to the same manner as described in Example 1, a composite laminated steel plate was obtained by using the resin (polyester) as shown in Table 3 and a curing agent (Coronate L). The laminated plate thus obtained was evaluated according to the same manner as described in Example 1.

The results are shown in Table 3.

TABLE 3

| | Resins (Polyester obtained in) | Shear adhesion strength (kg/cm²) | | Vibration damping property (η) | | | |
|---|---|---|---|---|---|---|---|
| | | Before heat treatment | After heat treatment at 200° C. for 30 min. | 10° C. | 30° C. | 50° C. | 70° C. |
| Ex. 1 | Prep. 1 | 165 | 165 | 0.11 | 0.55 | 0.35 | 0.15 |
| Ex. 2 | Prep. 2 | 220 | 190 | 0.02 | 0.12 | 0.22 | 0.57 |
| Ex. 3 | Prep. 3 | 175 | 165 | 0.09 | 0.50 | 0.32 | 0.13 |
| Ex. 4 | Prep. 4 | 170 | 165 | 0.13 | 0.50 | 0.39 | 0.20 |
| Ex. 5 | Prep. 5 | 170 | 170 | 0.12 | 0.56 | 0.40 | 0.18 |
| Ex. 6 | Prep. 6 | 175 | 180 | 0.13 | 0.45 | 0.36 | 0.25 |
| Ex. 7 | Prep. 7 | 170 | 155 | 0.20 | 0.48 | 0.31 | 0.12 |
| Ex. 8 | Prep. 8 | 170 | 160 | 0.15 | 0.53 | 0.22 | 0.11 |
| Ex. 9 | Prep. 9 | 180 | 170 | 0.14 | 0.52 | 0.25 | 0.13 |
| Ex. 10 | Prep. 10 | 150 | 145 | 0.28 | 0.57 | 0.20 | 0.12 |
| Ex. 11 | Prep. 11 | 130 | 120 | 0.08 | 0.56 | 0.25 | 0.10 |
| Ref. Ex. 1 | Ref. Prep. 1 | 110 | 65 | 0.05 | 0.42 | 0.12 | 0.02 |
| Ref. Ex. 2 | Ref. Ex. 4 | 80 | 50 | 0.06 | 0.35 | 0.08 | 0.01 |
| Ref. Ex. 3 | Ref. Ex. 5 | 60 | 50 | 0.03 | 0.15 | 0.08 | 0.01 |
| Ref. Ex. 4 | Ref. Ex. 6 | 70 | 40 | 0.06 | 0.35 | 0.11 | 0.01 |

EXAMPLES 12 to 14

Each film having 60 μm in thickness was obtained from the polyester obtained in Preparation 2, 5 or 6 by extrusion molding through a T-die. The film was sandwiched between two steel plates as used in Example 1 and, under the same adhesion conditions in Example 1, they were press-bonded with heating to obtain a composite steel plate. The properties thereof were evaluated according to the same manner as in Example 1. The results are shown in Table 4.

REFERENCE EXAMPLES 5 to 9

According to the same manner as described in Example 12, a composite steel plate having 60 μm was obtained except that the crystalline block copolyester obtained in Reference Preparation 1 or 2, ethylene-vinyl acetate copolymer (Evaflex 40 manufactured by Mitsui Polychemical Company, Japan), ionomer resin (Hi-milane 1652 manufactured by Mitsui-Du Pont Polychemical Company, Japan) or polybutylene terephthalate-polytetramethylene glycol block copolymer (Hytrel 4056 manufactured by Du Pont, U.S.A.) was used. The properties thereof were evaluated according to the same manner as in Example 1. The results are shown in Table 4.

Durability

A sample of the composite steel plate (25 mm × 15 mm) was subjected to heat treatment at 200° C. for 30

TABLE 4

| | Resins (Polyester obtained in) | Shear adhesion strength (kg/cm$^2$) | | Vibration damping property | | | | |
|---|---|---|---|---|---|---|---|---|
| | | Before heat treatment | After heat treatment at 200° C. for 30 min. | 10° C. | 30° C. | 50° C. | 70° C. | 90° C. |
| Ex. 12 | Prep. 2 | 150 | 110 | 0.04 | 0.14 | 0.21 | 0.58 | 0.33 |
| Ex. 13 | Prep. 5 | 110 | 90 | 0.15 | 0.60 | 0.31 | 0.09 | 0.05 |
| Ex. 14 | Prep. 6 | 120 | 100 | 0.18 | 0.52 | 0.28 | 0.13 | 0.06 |
| Ref. Ex. 5 | Ref. Ex. 1 | 100 | 30 | 0.02 | 0.03 | 0.05 | 0.06 | 0.05 |
| Ref. Ex. 6 | Ref. Ex. 2 | 80 | 20 | 0.03 | 0.05 | 0.04 | 0.04 | 0.04 |
| Ref. Ex. 7 | Evaflex 40 | 70 | 20 | 0.02 | 0.03 | 0.04 | 0.05 | 0.04 |
| Ref. Ex. 8 | Hi-milane 1652 | 150 | 80 | 0.01 | 0.02 | 0.04 | 0.06 | 0.05 |
| Ref. Ex. 9 | Hytrel 4056 | 80 | 20 | 0.03 | 0.04 | 0.04 | 0.06 | 0.05 |

EXAMPLE 15

The polyester (100 parts) obtained in Preparation 1, epoxy resin (33 parts) (Epicoat 1007 (30 parts) and Epicoat 828 (3 parts) manufactured by Yuka Shell Company, Japan), benzophenonetetracarboxylic dianhydride (3 parts) and hindered phenolic antioxidant (0.3 part) (Irganox 1010 manufactured by Ciba Geigy) were dissolved in cyclohexanone/xylene (1/1, v/v) at 100° C. and the solution was cooled to room temperature. As a ring opening catalyst for the epoxy, triphenylphosphine (0.5 part) was added. According to the same manner as described in Example 1, this solution was coated on a chromate treated cold-rolled steel plate, dried and bonded to obtain a composite laminated plate. The properties of the plate thus obtained was evaluated according to the same manner as described in Example 1. In addition, durability thereof was evaluated as follows:

minutes and then dipped in a 5 % saline solution at boiling for 50 hours. Peeling strength of the sample was measured at an elongation rate of 50 mm/min. and a temperature of 20° C.

Further, the conditions of rust were observed and evaluated according to the following criteria:
A: rusting within 1 mm part from the edge
B: rusting within 5 mm part from the edge
C: rusting almost all surface The results are shown in Table 5.

EXAMPLES 16 to 19 AND REFERENCE EXAMPLES 10 to 14

According to the same manner as described in Example 15, a plate was obtained by using the resin and other additives shown in Table 5. The properties of the composite steel plate thus obtained were evaluated according to the same manner as described in Example 15.

The results are shown in Table 5.

TABLE 5

| | Example | | | | | Reference Example | | | | |
|---|---|---|---|---|---|---|---|---|---|---|
| | 15 | 16 | 17 | 18 | 19 | 10 | 11 | 12 | 13 | 14 |
| Resins and Additives | | | | | | | | | | |
| Resin of Prep. 1 | 100 | 100 | — | — | — | — | — | — | — | — |
| Resin of Prep. 5 | — | — | 100 | — | — | — | — | — | — | — |
| Resin of Prep. 12 | — | — | — | 100 | 100 | — | — | — | — | — |
| Resin of Ref. Prep. 3 | — | — | — | — | — | 100 | 100 | — | — | — |
| Resin of Ref. Prep. 6 | — | — | — | — | — | — | — | 100 | — | — |
| Resin of Ref. Prep. 7 | — | — | — | — | — | — | — | — | 100 | 100 |
| Epicoat 1007 | 30 | 10 | — | 20 | — | 30 | 10 | 30 | 20 | — |
| Epicoat 1001 | — | — | 20 | — | 20 | — | — | — | — | 20 |
| Epicoat 828 | 3 | — | — | 2 | — | 3 | — | 3 | 2 | — |
| Benzophenone-tetracarboxylic dianhydride | 3 | — | — | 2 | — | 3 | — | 3 | 2 | — |
| Pyromellitic acid anhydride | — | — | 3 | — | — | — | — | — | — | — |
| Irganox 1010 | 0.3 | 0.3 | 0.3 | 0.3 | — | 0.3 | 0.3 | 0.3 | 0.3 | — |
| Coronate L | — | 10 | — | — | — | — | 10 | — | — | — |
| Triphenylphosphine | 0.5 | — | 0.5 | 0.5 | 0.5 | 0.5 | — | 0.5 | 0.5 | 0.5 (parts) |
| Properties | | | | | | | | | | |
| Shear adhesion strength (kg/cm$^2$) | | | | | | | | | | |
| Before heat treatment | 190 | 175 | 190 | 210 | 140 | 100 | 110 | 80 | 100 | 60 |
| After heat treatment at | 195 | 190 | 190 | 220 | 150 | 80 | 70 | 40 | 20 | 10 |

TABLE 5-continued

|  | Example | | | | | Reference Example | | | | |
|---|---|---|---|---|---|---|---|---|---|---|
|  | 15 | 16 | 17 | 18 | 19 | 10 | 11 | 12 | 13 | 14 |
| 200° C. for 30 min. Vibration damping property (η) | | | | | | | | | | |
| 10° C. | 0.08 | 0.08 | 0.09 | 0.18 | 0.15 | 0.03 | 0.02 | 0.04 | 0.06 | 0.08 |
| 30° C. | 0.41 | 0.50 | 0.45 | 0.67 | 0.66 | 0.24 | 0.18 | 0.25 | 0.57 | 0.58 |
| 50° C. | 0.40 | 0.38 | 0.43 | 0.43 | 0.35 | 0.20 | 0.25 | 0.22 | 0.28 | 0.23 |
| 70° C. | 0.18 | 0.16 | 0.19 | 0.25 | 0.22 | 0.01 | 0.01 | 0.01 | 0.10 | 0.08 |
| Durability Peeling strength (kg/25 mm) | | | | | | | | | | |
| Initial (after heat treatment at 200° C. for 30 min.) | 18 | 19 | 17 | 20 | 16 | 12 | 13 | 12 | 12 | 10 |
| After durability test | 13 | 9 | 12 | 14 | 8 | 2 | 4 | 2 | 2 | 2 |
| Rust | A | A | A | A | A | B | B-C | B-C | B-C | C |

As described hereinabove, by using the amorphous block copolyester as the adhesive of a composite vibration damping material, the maximum vibration damping ability can be improved and the effective temperature range of vibration damping property can be extended. Further, since the copolyester has an excellent reactivity with the polyisocyanate compound, the epoxy resin and the acid anhydride, adhesion as well as heat resistance are improved and, even after treatment at a high temperature such as baking finish, high adhesion strength can be maintained. Thus, durability of the composite vibration damping material is also improved.

What is claimed is:

1. In a vibration damping material of composits laminate structure containing a resin middle layer, the improvement which comprises inclusion of an amorphous block copolyester resin as said resin middle layer, wherein properties of the amorphous block copolyester resin include no clear melting peak appearing in measurement by differential scanning calorimetry of the amorphous block copolyester resin at a temperature rising rate of 10° C./minute in a nitrogen atmosphere, and a reduced viscosity not less than 0.4 dl/g.

2. The use according to claim 1, wherein the amorphous block copolyester resin comprises a block segment having a higher glass transition temperature and a block segment having a lower glass transition temperature, the glass transition temperature of said higher glass transition temperature segment is not lower than 40° C. and the difference between the glass transition temperature of said higher glass transition temperature segment and that of said lower glass transition temperature segment is not less than 50° C.

3. The use according to claim 1, wherein the amorphous block copolyester resin is obtained from a polyester by ring opening addition polymerization with a lactone at the terminal end of the polyester.

4. The use according to claim 3, wherein the lactone is a member selected from the group consisting of δ-valerolactone, ε-caprolactone, β-propiolactone, and β-2,2-dimethylpropiolactone.

5. The use according to claim 2, wherein the block segment having lower glass transition temperature is a polylactone.

6. The use according to claim 1, wherein the amorphous block copolyester has a reduced viscosity of 0.4 to 1.8 dl/g.

7. The use according to claim 1, wherein the amorphous block copolyester contains a tri- or higher polyfunctional ester forming component and the content of the component is 10 to 200 equivalent per 106 g of the resin.

8. A viscoelastic resin composition for a composite vibration damping material which comprises an amorphous block copolyester resin and at least one compound selected from the group consisting of polyepoxy compounds, polyisocyanate compounds and acid anhydrides, wherein properties of the amorphous block copolyester resin include no clear melting peak appearing in measurement by differential scanning calorimetry of the amorphous block copolyester resin at a temperature rising rate of 10° C./minute in a nitrogen atmosphere, and a reduced viscosity not less than 0.4 dl/g.

9. A composition according to claim 8, wherein the amorphous block copolyester resin comprises a block segment having a higher glass transition temperature and a block segment having a lower glass transition temperature, the glass transition temperature of said higher glass transition temperature segment is not lower than 40° C. and the difference between the glass transition temperature of said higher glass transition temperature segment and that of said lower glass transition temperature segment is not less than 50° C.

10. A composition according to claim 8, wherein the amorphous block copolyester resin is obtained from a polyester by ring opening addition polymerization with a lactone at the terminal end of the polyester.

11. A composition according to claim 10, wherein the lactone is a member selected from the group consisting of δ-valerolactone, ε-caprolactone, β-propiolactone, and β-2,2-dimethylpropiolactone.

12. A composition according to claim 9, wherein the block segment having lower glass transition temperature is a polylactone.

13. A composition according to claim 8, wherein the amorphous block copolyester has a reduced viscosity of 0.4 to 1.8 dl/g.

14. A composition according to claim 8, wherein the amorphous block copolyester contains a tri- or higher polyfunctional ester forming component and the content of the component is 10 to 200 equivalent per $10^6$ g of the resin.

15. A vibration damping material as claimed in claim 1, wherein metal plates surround said middle layer.

* * * * *